United States Patent [19]
Edstrom et al.
[11] 3,721,961
[45] March 20, 1973

[54] DATA PROCESSING SUBSYSTEMS

[75] Inventors: Gene H. Edstrom, Longmont; Russell M. Elwell, Boulder; John W. Irwin, Langmont, all of Colo.

[73] Assignee: International Business Machines Corp., Armonk, N.Y.

[22] Filed: Aug. 11, 1971

[21] Appl. No.: 170,859

[52] U.S. Cl. ....................340/172.5, 444/1
[51] Int. Cl. ....................G06f 11/04, G06f 15/16
[58] Field of Search ....................340/172.5

[56] References Cited

UNITED STATES PATENTS

| | | | |
|---|---|---|---|
| 3,564,502 | 2/1971 | Boehner et al. | 340/172.5 |
| 3,530,438 | 9/1970 | Mellen et al. | 340/172.5 |
| 3,374,465 | 3/1968 | Richmond et al. | 340/172.5 |
| 3,562,716 | 2/1971 | Fontaine et al. | 340/172.5 |

*Primary Examiner*—Gareth D. Shaw
*Attorney*—Herbert F. Somermeyer et al.

[57] ABSTRACT

Data processing peripheral subsystems are connectable to two different types of data processing systems, each having different capabilities. For example, one data processing system Type 1 has certain error recovery procedures which are greater and more effective than those available for Type 2. The peripheral subsystem detects the type of data processing system to which it is attached and adjusts its operational procedures for emulating the operation of a Type 2 data processing system to the operational capabilities of the Type 1 data processing system without internal changes within the data processing system. The peripheral subsystem is further adapted to operate in a degraded mode with a data processing system of either type when the situation demands it.

13 Claims, 3 Drawing Figures

DATA PROCESSING SUBSYSTEMS

DOCUMENTS INCORPORATED BY REFERENCE

1. IBM SYSTEMS JOURNAL, "The Structure of System/360", Parts I and II, Vol. 3, No. 2, 1964, Pages 119 and 142, respectively by G. A. Blaauw and F. P. Brooks, Jr., and W. Y. Stevens.

2. "IBM System/360 Engineering", by P. Fagg et al., PROCEEDINGS-FALL JOINT COMPUTER CONFERENCE, 1964, Pages 205–231.

3. U. S. Pat. No. 3,214,739 (a two-channel switch or multiple interface switch).

4. U. S. Pat. No. 3,303,476 (channel).

5. U. S. Pat. No. 3,336,582 (CPU channel commands to control unit).

6. U. S. Pat. No. 3,372,378 (a switching system for a data processing system).

7. U. S. Pat. No. 3,400,371 (a CPU).

8. U. S. Pat. No. 3,550,133 (a channel).

9. U. S. Pat. No. 3,377,619 (polling in a channel including select out).

10. Commonly assigned U.S. Pat. application Cormier et al., Ser. No. 101,079, filed Dec. 22, 1970, entitled "Command Retry Control by Peripheral Devices" now U.S. Pat. No. 3,688,274.

BACKGROUND OF THE INVENTION

The present invention relates to improvements in data processing peripheral subsystems, the combinations of data processing systems, and to such peripheral subsystems. Of particular interest are error recovery procedures within the combinations.

As new designs in data processing systems and subsystems come to fruition, an important aspect is forward and backward compatibility between the various designs. This is particularly true in peripheral data processing subsystems, such as magnetic tape subsystems, magnetic disk subsystems, communication subsystems, printer subsystems, and the like. It is desirable from an economic view to not only design a peripheral subsystem to operate with a newly designed computer or central processing unit, but also that the peripheral subsystem operate with prior designs. In many instances, the operation of peripheral data processing subsystems with prior designs requires that the peripheral subsystem operate in a degraded mode. That is, it does not perform to its optimum operational capability. The reason for this is the different architectural or system design concepts incorporated in the various central processing units and data processing systems.

Another aspect of forward/backward compatibility is the various levels of operating systems, i.e., executive programs in the data processing system which perform the scheduling and other functions for initiating and supervising data processing operations. Such designs of operating systems must match the operational design of an I/O or peripheral subsystem. In many instances, operating systems have input/output program modules for operation with the peripheral subsystems. The levels of these input/output modules can change with the various innovations incorporated within the operating system. Accordingly, it is desirable to have operational capability matches between peripheral subsystems, central processing unit designs, and operating systems without degrading their operations.

It is highly desirable, if possible, that certain capabilities of a new design be functionally incorporated into older designs. Included in this aspect are the error recovery procedures (ERP) of various operating and data processing systems.

Accordingly, it has been found wherein a data processing system consists of various equipment and programs of various levels of design the entire data processing system may degrade its operation to the lowest design level of equipment and programs incorporated into the system. It is highly desirable for economies in data processing operations that degradation to a lower level of design be avoided whether it be caused by a central processing unit, a peripheral subsystem, or the like.

SUMMARY OF THE INVENTION

It is an object of the present invention to provide apparatus and methods for upgrading interconnected programmed equipment having different design levels and operational capabilities to an operational capability related to the higher or later design level of one of the equipment/programs.

It is a further object to enhance operation of a central processing unit without alteration of its operating system or hardware by the attachment of a higher-level design peripheral subsystem, the improvement pertaining to operations with an attached peripheral subsystem. The operation of a central processing unit is enhanced in selected functions to that of a later designed central processing unit having greater capabilities with respect to those functions.

A first programmable unit, such as a peripheral I/O controller, is adapted to be connected to first or second class of CPU's or data processing systems. Each class has different operational capabilities. The first class of CPU's is responsive to a given status signal from the first unit to initiate in such first unit a first action followed by a second action, while the second class of CPU's is not responsive to the given status signal. The second class of CPU's, however, is responsive to a second status signal indicating yet another status not necessarily intimately associated with the first unit to initiate such second action in the first unit. The operation of the second class of CPU's is enhanced to that of the first class of CPU's by operation of the first unit without changing the second class CPU. First means in the first unit establish a given status signal. Second means in the first unit establish which class of CPU's will be operatively associated with such given status signal. Third means in the first unit are jointly responsive to the first and second means to either supply the given status signal to the first class CPU or to supply said second status signal to the second class CPU, while simultaneously independently initiating such first action within the first unit and preventing the second action from being initiated by the second class CPU until completion of the independently actuated first action.

In a more specific form of the invention, the operational interconnection involves error recovery procedures wherein the first action is a SELECTIVE RESET of the first unit or peripheral subsystem. The second action is a COMMAND RETRY of a previously unsuccessful operation by the first unit as command by either of the CPU's. The second status signal concerns an error condition within the channel connection between the second CPU and the first unit in which the second class CPU has established error recovery procedures. The first unit, by supplying a second status signal to the second class of CPU, deceives its operating system into believing that it has caused the error and requires it by the responsiveness programmed into the second class CPU to try a retry in order to recover its own error. Actually, the error may have occurred in the peripheral subsystem. The first class of CPU's, upon detection of an error in the peripheral subsystem, has the programming and hardware capabilities of selectively resetting the peripheral subsystem or first unit and then retrying to attempt to recover the error in the peripheral subsystem.

Recovery is provided from peripheral subsystem errors occurring whether or not the subsystem is actively operating with a CPU; i.e., errors are detected in a subsystem while not participating in data processing system operations. In this latter situation, there may not be a "retry," rather an attempt to proceed with data processing operations in spite of the indicated error, that is, a recovery by the system from an error condition even though data processing operations have not been adversely affected. In the enhanced system, error indications and error logs are supplied to a CPU without serious interruption of I/O channel functioning.

The foregoing and other objects, features, and advantages of the invention will be apparent from the following more particular description of a preferred embodiment of the invention, as illustrated in the accompanying drawings.

GLOSSARY OF ABBREVIATIONS AND ACRONYMS

This glossary provides a ready reference to the abbreviations used in describing the invention.

| | |
|---|---|
| ADDR | Address |
| ADDRI | Address In (A tag signal indicating address signals appear on CBI) |
| ADDRO | Address Out (a tag signal indicating address signals are being sent over CBO |
| ALU | Arithmetic-Logic Unit |
| BOC | Branch On Condition |
| CBI | Channel Bus In (lines for carrying data signals from I/O controller to CPU via INTFX) |
| CBO | Channel Bus Out (lines for carrying INTFX) signals from INTFX to controller 11) |
| CHNL | Channel, usually CHNL A or CHNL B |
| CMD | Command |
| CMDO | Command Out (a tag signal telling controller 11 to change operation in accordance with predetermined criteria and CBO contains a command byte |
| CPU | Central Processing Unit |
| CTI | Channel Tag In (a control signal supplied from an I/O controller to a data channel concerning the interpretation of other signals supplied over CBI) |
| CTO | Channel Tag Out (a control signal supplied from a data channel to an I/O controller interpreting other signals supplied over CBO) |
| CU | Control Unit or I/O controller |
| CUB | Control Unit Busy (a tag signal) |
| DIAG | Diagnostic |
| DILA | Disconnect In Latch, channel A |
| DILB | Disconnect In Latch, channel B |
| EA | Enable connection to channel A |
| EB | Enable connection to channel B |
| ERRL | Hardware error latch |
| FLG | Flag (a signal indicating a condition) |
| FRU | Field Replaceable Unit - LSR FRU, a register in LSR holding a number pointing to FRU causing error |
| GENRST | General Reset (resets all circuit to a start up condition) |
| IC | Instruction Counter |
| I/O | Input/Output |
| IR | Instruction Register |
| LSR | Local Store Register |
| MIS | Multiple Interface Switch |
| MPU | Microprogrammable Unit |
| OP | Operation |
| OPIN | Operation In (a tag signal) |
| PE | Phase Encoding (a recording scheme) |
| PWR RST | Power Reset (resets all circuits to a power-on sequence) |
| ROS | Read Only Store |
| RST | Reset |
| SELO | Select Out (a tag signal) |
| SELRST | Selective Rest |
| STAT | Status |
| UC | Unit Check |
| UPGMS | Microprogram(s) |

MULTIPLE-CLASS ERROR RECOVERY PROCEDURES

Figures 1, 2:
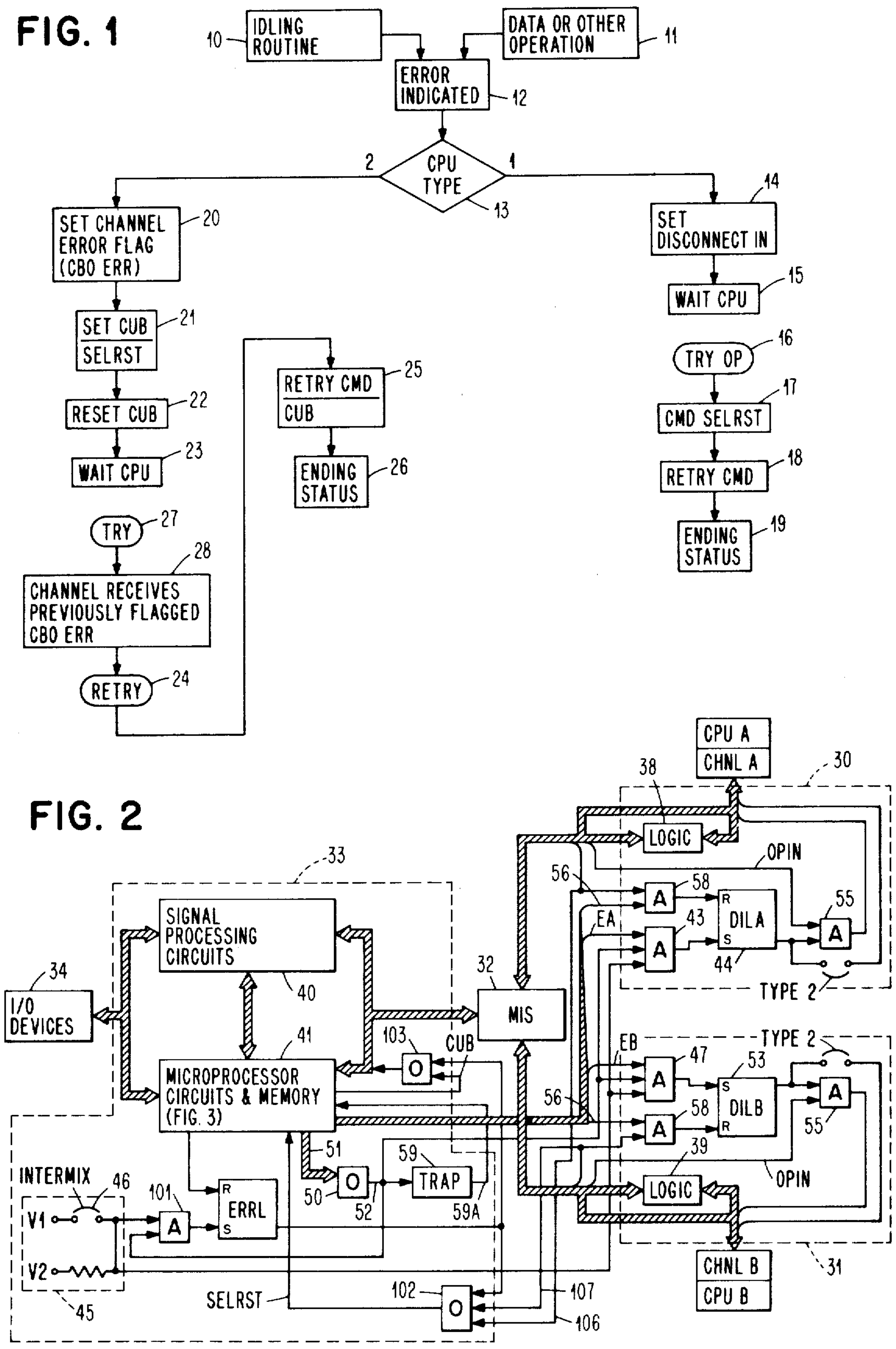
FIG. 1 is a simplified flowchart illustrating a practice of the present invention with respect to error recovery procedures.
FIG. 2 is a simplified logic block diagram of a system incorporating the teachings of the present invention and showing a multiple interface switch (MIS) connecting a peripheral subsystem to two different CPU's.

FIG. 1 is a simplified operational flowchart for a peripheral subsystem incorporating the teachings of the present invention. The peripheral subsystem is preferably microprogrammed. The microprograms include idling routine 10 active when not assigned to perform processing operations with a CPU. Routine 10 senses for error conditions within the subsystem. Additionally, errors are also detectable during the data or other operation 11 during which time the subsystem is performing an operation commanded by a CPU. Once an error is detected at 12, the peripheral subsystem at 13 determines the class of the central processing unit (CPU).

The peripheral subsystem can be connected to either a first or a second class of CPU's. For example, the first class of CPU's may be an IBM System 370 unit. The System 370 has a so-called DISCONNECT IN status signal which, when supplied at 14 by a subsystem, indicates to the CPU that the connected peripheral subsystem has an error condition and that the peripheral subsystem is disconnecting from the interconnecting channel. The subsystem then waits for CPU at 15. The CPU then determines what it should do with respect to the DISCONNECT IN signal. Generally, the operating system within a System 370 will enter a RETRY at 16 and send a channel command to the peripheral subsystem called SELECTIVE RESET (SELRST) at 17 which resets the peripheral subsystem to an initial status enabling it to be restarted by the connected CPU for attempting error recovery. Upon completion of the SELECTIVE RESET command, the CPU at 18 instructs the peripheral subsystem to retry. Retry will usually include a SENSE command transferring status signals to CPU. In a tape subsystem, RETRY may include moving tape to where the transducer is upstream from a block of data which was attempted to be read, for example. It will then command the tape to move for a second read try. In some magnetic tape subsystems, the read retry will be a read backward when the initial failing operation was a read forward, and vice versa. Upon completion of the retry, the peripheral subsystem will send in ending status at 19.

The second class of CPU may be an IBM System 360 which does not have the combined DISCONNECT IN and SELECTIVE RESET channel commands. Note that SELECTIVE RESET channel commands occur in the System 360 but are not issued in response to a DISCONNECT IN signal. Upon detection of an error and a CPU Type 2 is connected to the peripheral subsystem, the peripheral subsystem sets a channel error flag indication at 20. This is commonly referred to as a CBO ERR, indicating an error in signals received from the System 360 CPU channel. Next, the peripheral subsystem at 21 sets control unit busy (CUB) and initiates an internal SELECTIVE RESET (SELRST) operation. Upon completion of SELRST, it resets its CUB at 22 and waits for CPU at 23. Upon the first subsequent attempt by the CPU at 27 to initiate an I/O operation in the CU, the previously logged CBO ERR is presented at 28 in response to the channel command code. The CPU operating system then automatically performs a SENSE command and logs the error; then attempts an I/O data processing operation at 24. The CPU, via its interconnecting channel, initiates a RETRY at 24 by issuing RETRY command at 25. At this time, the peripheral subsystem again sets CUB; and upon completion of the operation, it sends ending status at 26 in the same manner as ending status was provided at 19. It should be noted that the two ending status are shown independently because the ending status being supplied to the Type 1 CPU may be more complete than the ending status supplied to the Type 2 CPU.

From inspection of FIG. 1, it is seen that the error recovery procedures of a Type 2 CPU having fewer capabilities than the Type 1 CPU are enhanced by operation of the peripheral subsystem without any changes in the Type 2 CPU. That is, error conditions in the peripheral subsystem not normally recoverable by the Type 2 CPU connection are now recoverable in a similar manner to the Type 2 CPU error recovery.

EXEMPLARY SYSTEM CONFIGURATION

Referring now more particularly to FIG. 2, a data processing environment in which the practice of the present invention may be found is illustrated in extremely simplified block diagram form. It is to be understood that in such an illustrated system the actual logic and operating program systems can be extremely complex. A complete description of such a system would serve merely to occlude the present invention rather than emphasize the invention by illustrating the changes in a system using such invention. The present invention finds practice not only wherein a single CPU is connected to a single peripheral subsystem, but also wherein plural CPU's are connected through appropriate switching means to plural peripheral subsystems. Plural peripheral subsystems may, in turn, be connected to a plurality of different CPU's.

Shown in FIG. 2, first and second CPU's A and B are connected via their respective interconnecting channel processors (not shown) through channel interface circuits 30 and 31 and thence through a multiple interface switch (MIS) 32 to I/O controller 33. I/O controller 33, in turn, is connected to a plurality of I/O devices 34. The arrangement in FIG. 2 is such that either CPU A or CPU B can select I/O controller 33 via MIS 32 for operating one or more I/O devices 34. CPU A and CPU B operate asynchronously with respect to each other. As a result, selection of I/O controller 33 may be simultaneous. Accordingly, MIS 32 includes so-called tie-breaking (priority) logic wherein CPU A has priority over any requests from CPU B. That is, if CPU B requests I/O controller 33 first, it obtains access to the peripheral subsystem 33, 34. However, if per chance, CPU A and CPU B both simultaneously attempt a selection of I/O controller 33, MIS 32 reacts to the simultaneous selection to give the selection to CPU A. Such tie-breaking logic is well known and need not be further described for a complete understanding of the present invention.

The key to the incorporation of the present invention into the illustrated system includes certain added circuitry within interface circuits 30 and 31, as well as within controller 33. These additional circuits are brought out in simplified form, and their respective connections to the channel and other logic circuits are also shown in simplified form. For example, in interface circuits 30 and 31, extensive logic circuits represented by blocks 38 and 39 provide timing and logic decision circuitry necessary for initial selection, exchange of data, and ending status between the CPU's and I/O controller 33. Logic circuits 38 and 39 are preferably identical such that the mode of operation between either of the CPU's and controller 33 is the same.

I/O controller 33, for magnetic tape subsystems, includes a set of signal-processing circuits 40 and a microprocessor 41 which controls signal-processing circuits 40 and provides programmed intercommunication communication with either CPU A or CPU B, as well as programmed control of the I/O devices 34. Control of an I/O controller via a microprocessor and intercommunication between special signal-processing circuits in a programmed apparatus is sufficiently well known not to warrant further description herein. Also within the I/O controller 33 are shown some special logic circuits associated with microprocessor 41 for effecting determination of the type of CPU to which the I/O controller is connected and the special logic circuits used to initiate SELECTIVE RESET in accordance with the type of CPU to which the subsystem is connected.

First, the error recovery procedure followed with a first type of CPU, i.e., for example, an IBM System 370, is described. Microprocessor 41, through its error detection circuits, detects an error within subsystem 33, 34. (It may receive an error indication from an I/O device 34.) Since I/O controller 33 does not know to which CPU the last operation apertained, it must send DISCONNECT IN to both CPU's and allow both CPU's to attempt recovery of the error. Appropriate signals are supplied by microprocessor 41, as will be later described, over cable 42 to interface circuits 30 and 31. An error A signal (EA) is supplied to AND circuit 43 for setting DISCONNECT IN LATCH A (DILA) 44 whenever CPU A is Type 1. This is determined by an actuating signal received from pluggable control 45 within controller 33. When cable jumper 46 is disconnected, both CPU's A and B are Type 1, an actuating signal is supplied to both AND circuits 43 and 47.

Additionally, AND circuits 43 and 47 receive error indicating signals from OR circuit 50. All hardware error indicating signals from processor 41 are supplied over cable 51 to OR circuit 50. The resulting single error indicating signal on line 52 goes to AND circuits 43 and 47 to set DISCONNECT IN LATCHES 44 and 53 to the active condition. Upon DILA and DILB being set, AND circuits 55 are enabled upon microprocessor 41 supplying the operation in (OPIN) signal through MIS 32 to interface circuits 30 and 31. AND circuits 55 supply DISCONNECT IN tag signals respectively to channel A and channel B. Channels A and B respond to the DISCONNECT IN signal to perform the function as described with respect to the flowchart in FIG. 1 and as set forth in Cormier et al. application, U.S. Pat. No. 3,688,274, supra. The operation of I/O controller 33 via MIS 32 with respect to either CPU then is in accordance with initial selection for effecting a retry after a commanded SELRST from the respective CPU.

For reasons beyond the present specification, if one of the two CPU's is a Type 1 and the other a Type 2, both CPU's operate as a Type 2. This is by arbitrary choice in order to reduce the cost of I/O controller 33. By additional cost, enhanced operation can be provided even in an intermix situation.

When either channel A or channel B initiates SELRST through logic circuits 38 or 39, respectively, DILA and DILB are reset via AND circuits 58. These AND circuits 58 are enabled by signals over lines 56 from I/O controller 33 enable/disable logic. Such enable/disable logic may include a manually actuated switch enabling the subsystem to operate. Such enable/disable operations have been used for the last several years in subsystems manufactured by International Business Machines Corporation.

The FIG. 2 illustrated system operates entirely different when connected to a Type 2 CPU. Then, upon detection of an error by microprocessor 41, OR circuit 50 supplies an error indicating signal over line 52. Trap circuits 59 force microprocessor 41 to a reference storage location in its ROS control memory starting an error recovery procedure, as will be more fully described. Simultaneously, the error indicating signal on line 52 is supplied to AND circuit 101 which passes a signal whenever jumper 46 is not connected; i.e., the I/O subsystem is connected to a Type 2 CPU. In this case, the hardware error indicating signal sets latch ERRL which is an internal error latch in processor 41. When set, latch ERRL activates an SELRST microprogram through OR circuit 102. Microprocessor 41 responds by activating the SELRST program and setting CUB via OR circuit 103 for informing CPU A and CPU B via MIS 32 that I/O controller 33 is not available. During SELRST microprogram, microprocessor 41 not only resets selected circuits to a starting condition, but also senses status conditions and sets flag bits indicating that an error was detected. This sensing is necessary for error recovery. The sensing of status conditions in a programmable machine is well understood and is not further described for that reason. Microprocessor 41, upon starting SELRST, supplies an actuating signal over line 104 resetting latch ERRL.

When connected to a Type 2 CPU, the I/O controller 33 and the I/O devices 34 upon completion of SELRST are prepared to receive the next attempted channel command from that type of CPU; i.e., the subsystem has been selectively reset by internal initiation. The error flags set during SELRST reject the next attempted channel command with an indication that the rejection was due to a CBO ERR. In this case, the next operation is initiated by the Type 2 CPU and not as described by Cormier et al, supra.

Comparing the above-described operation with a Type 1 CPU, i.e., one having DISCONNECT IN capabilities as described with respect to FIG. 1, the Type 1 CPU supplies a channel command "SELRST." Such channel command is decoded by either logic 38 or 39, resulting in the command signal being supplied by such logic circuits respectively over lines 106 and 107 through OR circuit 102. The microprocessor responds to such channel commands in the same way that the internally generated SELRST command was generated by setting ERRL. The microprocessor also supplies a CUB signal to OR circuit 103 during its response to the channel command SELRST.

The Type 2 jumpers in circuits 30 and 31 selectively provide direct connections from DILA 44 and DILB 53 to the channels. Upon certain operating conditions, it may be advantageous to supply DISCONNECT IN even though OPIN is not active. Such conditions include diagnostic procedures.

MICROPROCESSOR (MPU)

Figure 3:
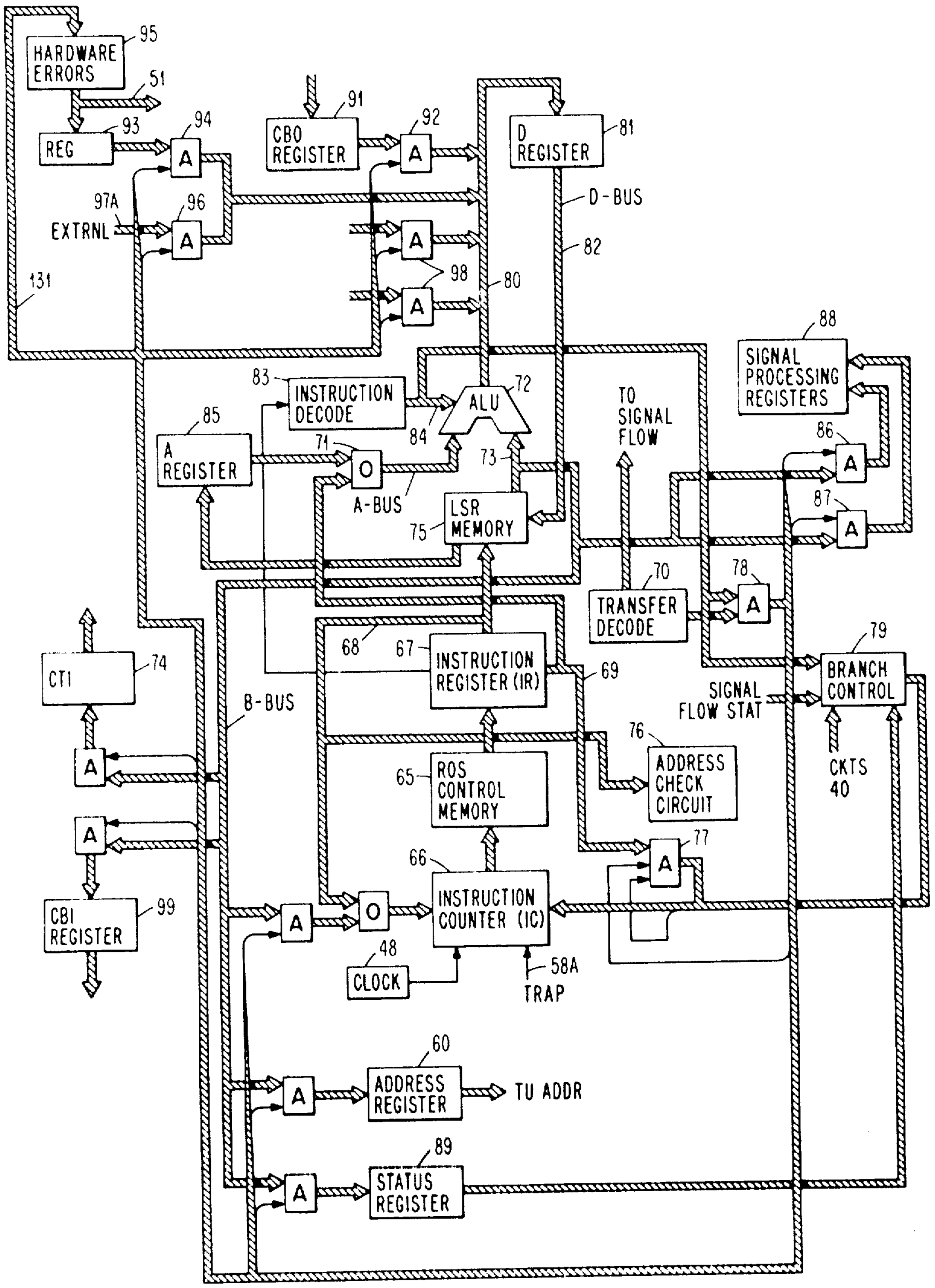
FIG. 3 is a simplified logic block diagram of a microprocessor usable with the system illustrated in FIG. 2.

Referring more particularly to FIG. 3, an MPU usable in I/O controller 33 is described in a simplified block diagram form. The microprograms are contained in read only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representive of control portions of the instruction word, such as the operation code and the like. Signals in cable 68 are supplied to IC 66 for effecting branching and instruction address modifications. Cable 69, on the other hand, carries signals representative of data addresses or constants. These are supplied to transfer decode circuits 70 which respond to the signals for controlling various transfer gates within MPU. The other portions of the signals are supplied through OR circuits 71 to ALU 72. In ALU 72, such signals may be merged or arithmetically combined with signals received over B bus 73 for indexing or other data processing operations.

MPU has local store register memory (LSR) 75 accessible in accordance with the address signals carried over cable 68. Address check circuit 76 verifies parity in the address. The address signals may also be used in branch operations. In a branch operation, AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. ALU 72 has two inputs, the A bus from OR circuits 71 and the B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuits 78 for selectively transferring signals within MPU.

ALU 72 has a limited repertoire of operations. Instruction decode 83 decodes four bits from the instruction word to provide 16 possible operations, each operation being eight parallel signals or one byte in extent. These operations are set forth in the Instruction Word List below:

TABLE I

Instruction Word List

| Op Code | Mnemonic | Function |
|---|---|---|
| 0 | STO | Store constant in LSR, A set to 0 |
| 1 | STOH | Store constant in LSR, indexed addressing |
| 2 | BCL | Match with Field 1, branch to Addr in Field 2 |
| 3 | BCH | Match with Field 1, branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | OO | Not used — illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A EXCLUSIVE OR B, result to LSR 75 |
| F | XOM | A EXCLUSIVE OR B, result not stored |

In the above list, the letter "A" means A register 85, "B" is the B bus, and the mnemonics are for programming purposes. The term "selected input" indicates one of the hardware input gates (92, 94, 96, 98) to the ALU output bus 80. The term "selected register" indicates one of the "hardware" registers in MPU. These include signal processing circuit control registers 88, CTI register 74, status register 89 (for internal branching), CBI register 99, address register 60, and IC 66. Note that transfers from LSR 75 to these selected registers are via B bus 73. Signal processing registers 88 receive signals via AND circuits 86 and 87. Such registers set up operating conditions in circuits 40. For example, in a tape subsystem, many I/O tape drives can record in either NRZI or PE. Registers 88 actuate appropriate detection and recording circuits to effect such operation. Additionally, other operating characteristics, such as pulse frequencies, are imposed on circuits 40 by processor 41.

Transfer of data signals between devices 34 and CPU's is through circuits 40. Signals to be recorded are received in CBO register 91, checked for parity by processor 41. then supplied to one of the registers 88 for signal processing by circuits 40. Similarly, data signals from devices 34 are received by circuits 40, supplied through AND circuits 98, parity checked by processor 41, and then supplied to a CPU via CBI register 99. Branch control 79 receives status signals from circuits 40, the microprogram senses such status, and then branches to actuate the appropriate AND circuits for effecting data transfer.

Alternately, circuits 40 may receive and transmit data signals independently of processor 41 with all error detection/correction performed by hard-wired sequences. Hardware error signals are generated in circuit 95 in accordance with known techniques. AND circuits 96 receive external data signals over cable 97A for supplying same to D register 81 under microprogram control. Such external signals may be from an operator's console.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 are stored in LSR 75. If it is desired to output the results of the arithmetic operation, then another cycle is used to transfer the results from LSR 75 over B bus 73 to a selected output register such as one of the interchange registers or bus register 99.

MPU is trapped to a predetermined routine by a signal on trap line 59A. The trap signal forces IC 66 to all zeroes. At ROS address 000, the instruction word initiates a trap routine, which in this application traps to a ROS address containing the first instruction word of an SELRST microprogram.

TYPE I FLOWCHART

The below flowchart shows combined microprogram and channel operations for a Type 1 CPU connection.

Step 1A — Error detected by CU.

Step 1B — CU determines if OPIN active.

ACTIVE: Go to 1G

INACTIVE: Proceed below at 1C

Step 1C — CU logs error bits in LSR 75.

Step 1D —

Scan I/O devices for interrupts and device ends; then wait for channel SIO/TIO/POLL.

Step 1E —

Respond to channel SELO with OPIN and DISCONNECT IN (set DILA or DILB and activate OPIN).

Step 1F —

COMMAND RETRY per Cormier et al. document (10).

Step 1G —

Set DILA/DILB (OPIN is active, so DISCONNECT IN is immediately transmitted to the appropriate channel). Then go to 1F.

TYPE 2 FLOWCHART

This flowchart shows CU microprogram and channel operations when connected to a Type 2 CPU and using the present invention to enhance operation to that shown in the Type 1 Flowchart.

Step 2A —

Error detected by CU.

Step 2B —

CU determines if OPIN active.

ACTIVE: A check or error condition called channel check may be caused. Generally, manual intervention will be required. Clear CTI and CBI, then go to 2C for attempted error recovery. Alternately, a channel check condition is forced by sending in illegal tag in combinations, forcing parity error on status in, etc. CPU then attempts to recover from such channel errors resulting in CU or subsystem error recovery.

INACTIVE: Go to 2C.

Step 2C —

CU logs error bits in LSR 75.

Step 2D —

CU performs SELRST.

Step 2E —

CU enters IDLEPEND without scanning I/O devices. IDLEPEND means no action by CU until channel activates CU by SELO and ADDRO with an address code on CBO.

Step 2F —

Channel issues SELO and ADDRO.

Step 2G —

CU sends STATIN with UNIT CHECK code on CBI.

Step 2H —

Channel sends SIO with CMDO having command code SENSE on CBO.

Step 2I —

CU responds with sense bytes including CBO ERR and ALU error indications on CBI.

Step 2J —

In response to CBO ERR, channel attempts to recover its own error as indicated by CU (actually, it's a subsystem error to be recovered, not a real CBO error). To do this, channel reissues SIO or TIO to recover from error condition.

CU, by indicating CBO ERR, forces CPU/channel via its programming to attempt or test an I/O operation. In attempting to recover from CBO ERR, subsystem errors are recovered because of SELRST in 2D (Error conditions are logged and reset) thereby emulating Type 2 operation to Type 1 operation purely on subsystem operations.

A CU MICROPROGRAM IMPLEMENTATION

The two flowcharts above illustrate system (channel-CU interaction) operation using the invention. The below flowchart and description show a preferred way of implementing the invention in a microprogrammable CU.

Step M1 —

Error circuits trap CU to ROS = 000 via line 59A in FIG. 3 which corresponds to steps 1A and 2A.

Step M2 —

Control unit Busy activated.

Step M3 —

Verify that trap did not result from either a power or general reset of CU. In a power or general reset, another microprogram resets CU in accordance with procedures different from error recovery procedures of the microprogram represented by this flowchart.

Step M4 —

Check for previously logged errors in LSR 75. This is accomplished by sensing the LSR FRU FLG (FRU = Field Replaceable Unit; FLG = flag). If errors have already been logged in LSR 75, proceed to step M9. If no errors have been logged, proceed to step M5 for fetching error conditions.

GENERATION OF LSR FRU FLG

Generation of an FRU indicator is by microprogram which scans error indicating circuits after respectively initiating functions for detecting errors. The microprogram scan is assigned a number of segments, each segment representing a failing FRU. Each time a scan element is completed, one is added to a number in a register in LSR 75. That number is indicative of the failing portion of the microprocessor. For example, number 012 may indicate an error in a CTI register. Other numbers indicate other portions of the microprocessor and CU which may have failed. This number is maintained in LSR 75 in an error counting register. Upon detection by the microprogram that the contents of that register are nonzero, the numerical contents are transferred to the register entitled LSR FRU. This is a logging register for receiving the FRU count just prior to transmittal to CPU. Upon loading this register, the microprocessor sets one bit in a flag register, the bit being entitled LSR FRU FLG which indicates that LSR FRU contains a numerical count indicative of a last scanned error. When LSR FRU is transmitted to CPU, LSR FRU FLG is erased telling the microprogram that LSR FRU now is empty and that no error conditions currently have been logged. Accordingly, when LSR FRU FLG is zero, new error conditions can be fetched from the error count register. If, however, LSR FRU FLG is one, an error count already resides in LSR FRU.

Step M5 —

This step fetches the numerical contents of the error count register in LSR 75, transfers it to LSR FRU register, and simultaneously sets LSR FRU FLG. The transfer is effective only after the microprocessor ascertains that the numerical content of the error count register is nonzero. If the content is zero, no transfer is effected; and, hence, the LSR FRU FLG remains a zero.

Step M6 —

Microprocessor now senses the numerical value of LSR FRU FLG. If it is 0, the microprogram goes to step M12 in a routine not related to the present error recovery procedure but briefly explained to set the environment in which the error recovery microprogram resides. If LSR FRU FLG = 1, step M7 is performed.

Step M7 —
This step prepares LSR FRU register to receive a new FRU count. This is done by clearing LSR FRU, i.e., setting it to all 0's.

Step M8 —
The numerical contents of the error count register (FRU) are transferred to LSR FRU register in preparation for transfer to CPU. Simultaneously, LSR FRU FLG is set to a 1.

Step M9 —
NOTE: Entry is either from step M4 or M8. Microprocessor sets error flags in LSR 75 in preparation for sending UC signal to CPU as well as transferring the numerical contents of LSR FRU to the interface circuits for transmittal over CBI to indicate the microprocessor is in error and the location or numerical indication of the FRU.

Step M10 —
The microprogram tests for an SELRST. If it is an SELRST, the program exits to an SELRST microprogram not a subject of the present disclosure. If it is not an SELRST, step M11 is executed. SELRST, however, does not reset the LSR FRU FLG, FRU REG, or the flags set in step M9. After performing all other functions of SELRST, the microprogram rejoins at step M11.

M11 —
The microprogram resets hardware error circuits 95 and hardware error register 93 via transfer decode 70.

Step M12 —
(Entry either from M6 or M11) The microprogram tests for initial selection. If it is not an initial selection sequence, the program is exited to another microprogram not the subject of the present disclosure. If it is an initial selection sequence, the microprogram continues in preparation for supplying status to CPU.

Step M13 —
The microprogram checks for ADDRO tag (address out). If it is not ADDRO, the CU need do nothing and proceeds to another microprogram. If ADDRO is active, it then proceeds along the present flowchart.

Step M14 —
In response to ADDRO and INITSEL, the microprogram first determines whether or not the SIO/TIO causing the INITSEL can be answered. That is, it senses for stacked status in LSR 75, such as CE's (channel ends) for various I/O devices, CUE, and the like. If such status exists for an address other than that accompanying the SELO, the CU signals an end to the sequence by raising STATIN tag. The microprogram then returns to IDLEPEND to await another selection attempt. If no such status exists or the address does match, CU then raises OPIN to proceed with INITSEL sequence. OPIN indicates to CPU that the CU is operating and is proceeding with the selection sequence. (See Documents Incorporated by Reference for details of the INITSEL sequence including timing considerations.)

Step M15 —
The microprogram again senses for LSR FRU FLG = 1 to test whether or not errors have been logged in LSR FRU. At this time, in the microsequence, the UC forcing flag has already been set in the logic circuits. See step M9. If all f these are 0, microprogram exits to another microprogram not the subject of the present disclosure. If they are nonzero, i.e., error conditions should be reported to CPU, step M16 is performed. NOTE: The microprogram to this point is the same for both Type 1 and Type 2 CPU's. Step M16 is performed primarily for enhancing the Type 2 CPU operation, i.e., response to error conditions in the subsystem to that of the Type 1 CPU response. Step M16 is performed in the microsequence for both Type 1 and Type 2 CPU connections.

Step M16 —
Microprogram in LSR 75 sets "post UC" flat which logs the UC condition indicated by LSR FRU FLG and the flags set in logics 38 and 39. It also sets LSR 75 flag "status pending" indicating to the microprocessor during a subsequent INITSEL SIO/TIO that initial status has to be reported to CPU. This initial status will include error indications. Next, the microprocessor rests the UC flags in LSR 75. This is done so that s subsequent SIO will not receive a UC, particularly if it is a Type 2 CPU. The step is completed by continuing to present status and reset status indicators not pertinent to the practice of the present invention.

Upon completion of this step, because of rules set forth in the operating system, CU enters a wait state because of the UC flag awaiting either the Type 1 or Type 2 CPU to issue a SENSE command via its channel processor. The generation and issuance of a SENSE command by a channel processor is described in the Documents Incorporated by Reference. The below flowchart indicates the response by CU to SENSE command with respect to the practice of the present invention.

Step S1 —
CU receives the CHANNEL SENSE command and enters a sense microprogram briefly shown in steps S2–S7 in simplified form in order to bring out the relationship of the sense routine to the practice of the present invention.

Step S2 —
The microprocessor and CU perform the usual INITSEL sequence as set forth in the Documents Incorporated by Reference.

Step S3 —
As a part of the INITSEL sequence, the microprogram tests for LSR FRU FLG = 1. If it is a 0, other portions of a sense microprogram are entered which are not described, as they do not pertain to the practice of the present invention. If. LSR FRU FLG = 1, step S4 is performed. NOTE: Step s4 is inserted in the microprogram in order to enhance the Type 2 CPU operation in error recovery to that of a Type 1 CPU response.

Step S4 —

In LSR 75, a flag indicates "CBO ERR" (channel bus out is in error). In setting CBO ERR, the microprocessor forces the Type 2 CPU to try to recover from a CBO ERR. The type 2 CPU is programmed to recover only such errors and is not capable of recovering from error conditions within CU. On the other hand, the TYPE 1 CPU is programmed to recover via the DISCONNECT IN signal the errors within CU. It is also programmed to recover from CBO ERR conditions. However, because of the UC and the FRU signal, the Type 1 CPU is preferably programmed to give priority to error recovery from errors within CU. It is also programmed to erase the CBO ERR signal. As a practical matter, attempted recovery from CBO errors also recovers from error conditions within CU. Accordingly, step S4 enhances the Type 2 CPU operation in error recovery procedures to that of the Type 1 CPU without adversely affecting the operation of the Type 1 CPU. The remaining steps S5–S7 are performed identically for Type 1 and Type 2 CPU's.

Step S5 —

The microprogram tests for LSR FRU FLG. If it is a 0, sense program continues in a portion not pertinent to the practice of the present invention. If it is 1, an FRU error count is in LSR FRU. The microprogram then proceeds to S6.

Step S6 —

The microprogram in LSR sets the FRU SNS FLG, resets LSR FRU FLG, and clears LSR FRU. The contents of LSR FRU are transferred to a working register in LSR 75.

Step S7 —

The sense information is transferred to CBI in accordance with the procedures set forth in the Documents Incorporated by Reference. Ending status is sent in, and the CU waits for further instructions from the channel processor or CPU.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. For a data processing system, a first peripheral unit adapted to be connected with first or second classes of CPU's, the classes having differing operational capabilities;

the first class of CPU's being responsive to a given status signal from the first unit to initiate in said first unit a first action followed by a second action, said second class of CPU's not being responsive to said given status signal but being responsive to a second status signal indicating another status to initiate said second action in the first unit;

the improvement in said first unit including the combination:

first means establishing said given status signal, second means establishing which class of CPU's will be operatively associated with said given status signal, and third means jointly responsive to said first and second means either to supply said given status to said first class CPU or to supply said second status signal to said second class CPU while simultaneously independently initiating said first action in said first unit while preventing said second action by said second class CPU until completion of said independent first action.

2. The unit set forth in claim 1 wherein said given status signals represent an error condition associated with said first unit, and said second status signal indicates an error condition in signals received by said first unit from said CPU's.

3. The unit set forth in claim 2 wherein said first action is SELECTIVE RESET (SELRST) and said second action is RETRY of a previous unsuccessful operation by said first unit.

4. A system including the unit set forth in claim 3 further including a peripheral device connected to said first unit and operative within said first unit to perform signal-processing functions related to functions performed in either class of CPU and said given status signal resulting from a hardware error condition.

5. The system set forth in claim 4 further adapted to operate with two CPU's via switching means controlled by said CPU's, said second means being further responsive to said switching mean to ascertain in which class either CPU resides.

6. The system set forth in claim 4 wherein channel means interconnect said second class CPU and said first unit, said second status signal indicating an error condition in said channel means detected by said first unit, and a second class of peripheral units not having self-initiatable SELRST connectable via said channel means to said CPU's and operative with said second status signal to RETRY only said channel means error conditions with said second class CPU's while said first unit is capable of attempting recovery from additional error conditions over said same channel means.

7. The system set forth in claim 4 further including either first channel means or second channel means for respectively connecting said first unit to said first or second class CPU's, said first channel means adapted to receive DISCONNECT IN from said first unit and supplying an SELRST command to said first unit immediately followed by a COMMAND RETRY for effecting said second action of retrying a previously attempted operation, and said second channel means not capable of responding to said DISCONNECT IN but capable of attempting a data processing operation in response to said second class CPU.

8. The method of enhancing total system operation by selected sequences in a peripheral subsystem, said system including at least one CPU of given operational capability, said selected sequences in said peripheral subsystem effect on total system operation being similar with respect thereto for predetermined actions irrespective of first or second CPU's of differing capabilities in said total system and which control said subsystem via a predetermined interface, the following steps in combination:

establishing a signal condition and indication in the peripheral subsystem of the given capability of a connected and controlling CPU, establishing and executing a short sequence of operations in said subsystem for a first capability controlling CPU including a sequence of responsive steps to a series of commands from such controlling CPU, and establishing and executing a long sequence of operations in said subsystem for a second capability controlling CPU, including sending a status signal in said long sequence to such second controlling CPU indicating an operational state in said interface detected by said subsystem, causing said second controlling CPU to initiate an action in said subsystem functionally equivalent of cooperative action in said short sequence between said first capability controlling CPU and the subsystem whereby the total operational capability of said second controlling CPU is effectively enhanced to that of said first controlling CPU.

9. The method set forth in claim 8 wherein said CPU capabilities relate to automatic recovery from error conditions in said subsystem;

actuating a first controlling CPU to actuate said subsystem to perform a first short sequence including logging error conditions therein and sending a DISCONNECT IN signal to said first controlling CPU and then actuating said subsystem to await a command signal from such first controlling CPU;

then actuating said first controlling CPU to sequence reset and sense short-sequence commands to said subsystem, actuating said subsystem to perform said short-sequence commands and then actuating said first controlling CPU to try a data processing operation with the subsystem; and actuating a second controlling CPU to actuate said subsystem upon detection of an error to log said error, then actuating said subsystem to perform said RESET as a said long sequence, actuating the subsystem to send to said second controlling CPU an error indicator indicating an error in said connections, actuating said second controlling CPU to attempt error recovery for such indicated error by sequencing a SENSE command followed by a data processing command, and actuating said subsystem to respond to such commands thereby emulating said second controlling system operation to said first controlling CPU operation with respect to such error recovery procedure.

10. The method set forth in claim 9 further actuating said subsystem to detect such errors during idle periods interleaved with data processing commands.

11. The method set forth in claim 10 further actuating said subsystem to prevent said connection error indication before initiating said RESET and during said RESET actuating the subsystem to set a busy status to prevent selection before subsystem reset is complete.

12. A two-mode I/O controller (CU) having a microprocessor, and signal processing circuits, said I/O controller adapted to be connected to either a first or second type controlling system, the improvement including the two-mode control in combination:

control memory means containing control programs, each program having a routine starting address in the control memory, interface circuits in said controller adapted to be connected to either a first or second type controlling system, means indicating the type of system to which CU is connected, means supplying an indication of a given operational state in the controller, means indicating an error, ERRL means jointly responsive to one of said type indications indicating a second type controlling system and to said error indication to initiate a first action in said microprocessor and simultaneously indicate busy status, DIL means jointly responsive to said error condition and to another one of said type indications indicating said first type controlling system to supply an error indication, and means in said interface circuits responsive to certain received signal for initiating said first action and including means combining said EERL means initiation with said received signal initiation.

13. The two-mode controller set forth in claim 12 wherein said circuit means includes:

trap means responsive to said operational indication to trap said microprocessor to a given routine starting address irrespective of which type of controlling system is connected thereto, memory means for memorizing said operational indication only when said second controlling system is connected to said interface circuits, forcing means responsive to said memory means for establishing an operation in said microprocessor settable by said first controlling system in response to a signal representing said operational condition, and said microprocessor responsive to said given operational state to indicate an error condition recoverable by said second controlling system even though said operational indication relates to an error not recoverable by such second controlling system.

* * * * *